United States Patent Office 3,248,637
Patented Apr. 26, 1966

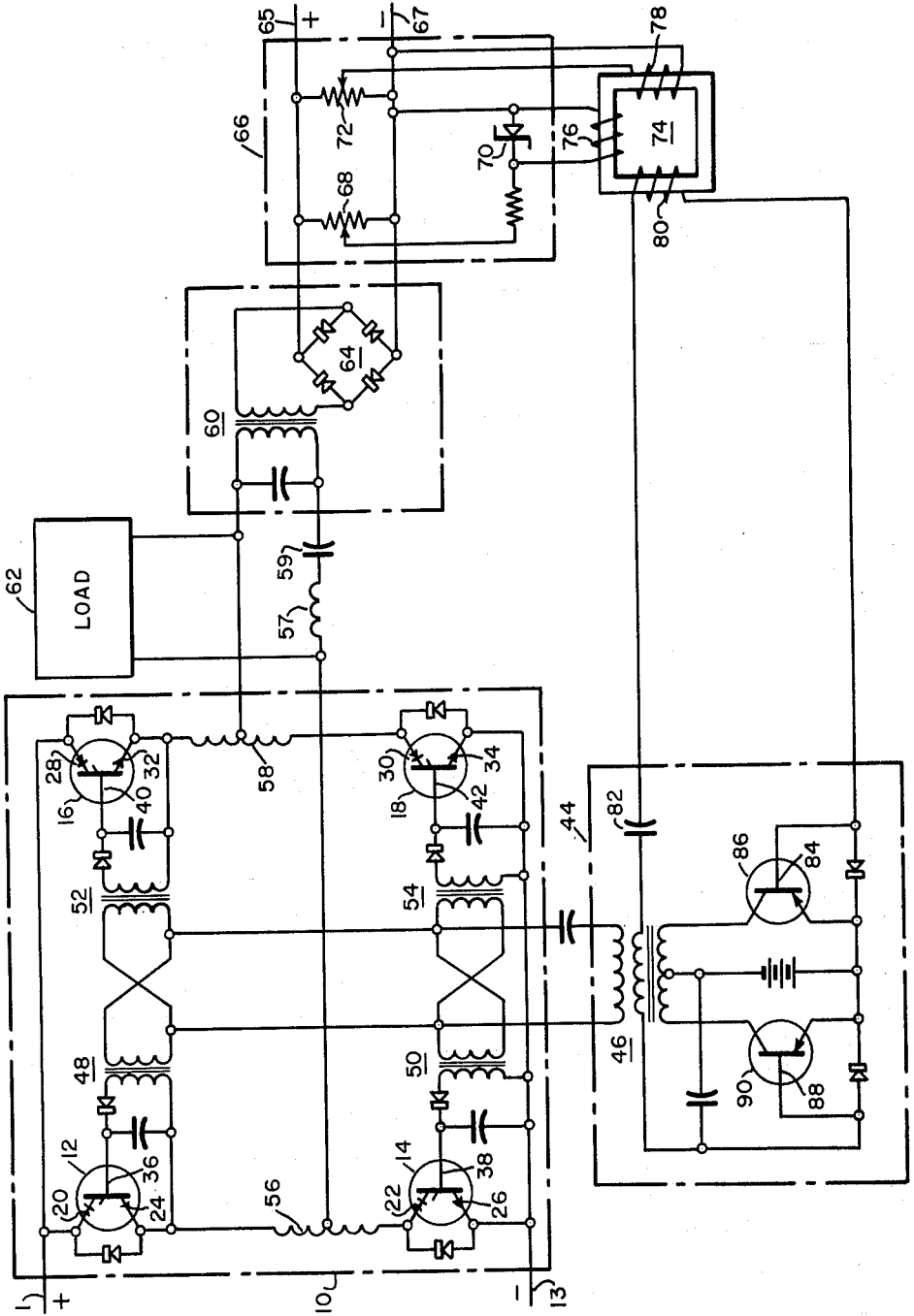

3,248,637
STATIC INVERTER FOR CHANGING UNREGULATED D.C. TO A.C. AND REGULATED D.C.
Willard S. Albert, Trafford, and Arthur B. Ross, Latrobe, Pa., assignors to Westinghouse Electric Corporation, East Pittsburgh, Pa., a corporation of Pennsylvania
Filed July 24, 1961, Ser. No. 126,100
5 Claims. (Cl. 321—18)

This invention relates in general to electrical converters and more particularly to converters supplying an alternating current and a regulated direct current from an unregulated direct current source.

Although its application is not restricted thereto, the converter forming the present invention is particularly adapted for use in transportation systems powered by direct current.

At the present time, multiple unit subway cars utilize direct current for powering fluorescent lamps and a motor-generator set to charge the storage batteries provided for emergency operation. When lighting fluorescent lamps from direct current power there is a large power loss in the ballast resistor used to limit the lamp current. In addition, the motor-generator sets are usually large and heavy as compared to static devices and also require more mechanical maintenance.

Accordingly, it is the general object of this invention to provide a new and improved static converter.

It is a more particular object of this invention to provide a new and improved static converter which provides alternating current power output and regulated direct current power output when supplied by an unregulated direct current input.

Briefly, the present invention accomplishes the above cited objects by providing an inverter to convert a randomly varying direct current supply to alternating current, rectifying the resulting alternating current, and controlling the frequency of the alternating current in accordance with the magnitude of the rectified signal to thereby regulate the output of the rectifier. In subway car applications, a portion of the alternating current power provided by the inverter may be used to power fluorescent lamps and the regulated direct current power provided by the rectifier may be used to charge storage batteries. The voltage regulation of the output direct current power is obtained by applying a sample of the direct current voltage at the output of the rectifier to a saturable reactor which controls the frequency of oscillation of a substantially square wave oscillator. The output from the oscillator is used to control the conductivity of the controlled rectifiers, which form the inverter, to thus control the frequency of operation of the inverter which, of course, varies the frequency of the alternating current output from the inverter being rectified by the rectifier. The magnitude of the direct current voltage output of the rectifier is dependent upon both the frequency and magnitude of the alternating current applied to the rectifier. The magnitude of the alternating current output of the inverter is dependent upon the magnitude of the random varying direct current input to the inverter. Therefore, if the direct current voltage from the rectifier changes, due to a change in the magnitude of the alternating current, the magnitude of the sample voltage changes causing a change in the frequency of oscillation of the oscillator and the frequency of operation of the inverter. The change in frequency of operation of the inverter returns the rectified voltage at the output of the rectifier to the original value.

Further objects and advantages of the invention will become apparent as the following description proceeds and features of novelty which characterize the invention will be pointed out in particularity in the claims annexed to and forming a part of the specification.

For a better understanding of the invention reference may be had to the accompanying drawing in which the single figure is a schematic diagram of the electrical conversion system of this invention.

Referring now to the drawing, a bridge inverter circuit 10 using controlled rectifiers 12, 14, 16 and 18 is shown. The controlled rectifiers 12 and 14 are connected in series circuit relationship across the direct current source so that their anodes 20 and 22 are always positive with respect to their cathodes 24 and 26, respectively. Similarly, controlled rectifiers 16 and 18 are connected in series circuit relationship across the direct current source so that their anodes 28 and 30 are normally at a positive potential with respect to their cathodes 32 and 34, respectively. The illustrated controlled rectifiers will commence conduction at the occurrence of a positive pulse at the control electrodes 36, 38, 40 and 42 with respect to the cathodes 24, 26, 32 and 34, respectively and will continue to conduct until the magnitude of the current through them is reduced to a value below the holding current of the controlled rectifier.

The positive potential at the control electrodes 36, 38, 40 and 42 is provided by a square wave oscillator 44 whose output is coupled by transformer 46 to the respective primary windings of transformers 48, 50, 52 and 54. During that half cycle when the right end of the secondary winding of the transformer 46 is positive a positive pulse is applied through transformers 48 and 54 to control electrodes 36 and 42 of controlled rectifiers 12 and 18. The positive pulse on the control electrodes 36 and 42 of controlled rectifiers 12 and 18, respectively, causes the controlled rectifiers 12 and 18 to commence conduction to thereby cause current to flow from the positive input terminal 11 through the series circuit comprising the anode 20 and cathode 24 of controlled rectifier 12, the upper half of the inductor 56, coil 57, capacitor 59, the primary winding of transformer 60, the lower half of inductor 58 and the anode 30 and cathode 34 of controlled rectifier 18 to the negative terminal 13. Current continues to flow in this circuit until the capacitor 59 is charged to a value sufficient to reduce the magnitude of the current through the controlled rectifiers 12 and 18 to the holding current of rectifiers 12 and 18 whereby the controlled rectifiers 12 and 18 switch to their blocking state until triggered by a succeeding pulse to the control electrode from the oscillator 44.

During alternate half cycles of the square wave produced by oscillator 44 the left end of the secondary of transformer 46 is positive. This places a positive potential through transformers 50 and 52 to the control electrodes 38 and 40, respectively, of controlled rectifiers 14 and 16, respectively. The positive potential on control electrodes 38 and 40 of controlled rectifiers 14 and 16 renders controlled rectifiers 14 and 16 conductive. Under these conditions, current flows from the positive input terminal 11 through the anode 28 and cathode 32 of controlled rectifier 16, the upper half of the inductor 58, the primary winding of transformer 60, the capacitor 59, the coil 57, the lower half of inductor 56 and the anode 22 and cathode 26 of controlled rectifier 14 to the negative input terminal 13. This current charges capacitor 59 in the opposite direction and the magnitude of the current is again reduced below the holding current of rectifiers 14 and 16 to thereby cause controlled rectifiers 14 and 16 to switch to a blocking state until the succeeding pulse is applied to control electrodes 38 and 40 from oscillator 44. It can be seen that an alternating current flows in the primary winding of transformer 60 at a frequency dependent upon the frequency of oscillation of the oscillator 44. As previously mentioned, an alternating current load 62, such as the fluorescent lights of subway cars, may be connected between the center taps of the inductors 56 and 58.

The magnitude of the alternating current output of the inverter 10 is dependent upon the magnitude of the randomly varying direct current input to inverter 10. That is, as the voltage from the direct current source increases or decreases the magnitude of the alternating current from the inverter increases or decreases, respectively.

The secondary winding of transformer 60 is connected to the input terminals of a bridge rectifier 64. The magnitude of the direct current voltage output from the rectifier 64, appearing at terminals 65 and 67, of course, depends on the magnitude and frequency of the alternating current input to the rectifier. That is, an increase in either the magnitude or frequency of the alternating current input to the rectifier will cause an increase in the magnitude of the direct current output of the rectifier. Similarly, a decrease in either the frequency or magnitude of the alternating current input will cause a decrease in the magnitude of the output of the rectifier 64.

The circuit 66 is a voltage sampling circuit which serves to control the frequency of operation of oscillator 44. Variable resistor 68 of circuit 66 is so adjusted that at the lowest expected value of direct current voltage from the direct current source, the voltage applied to the Zener diode 70 will exceed the breakdown voltage and the Zener diode 70 will conduct in the reverse direction thereby providing a constant bias on winding 76 of saturable reactor 74 such that saturable reactor 74 is in a saturated state.

As previously stated, an increase in the direct current input voltage will cause the magnitude of the alternating current from the inverter 10 to increase and thus cause the direct current output of the rectifier 64 to increase. This increases the voltage applied across variable resistor 72 which in turn, increases the current through winding 78 which is connected in opposition to winding 76 thereby driving the saturable reactor 74 out of saturation. The voltage across variable resistor 68 also increases but the voltage across winding 76 will, of course, remain constant, as regulated by Zener diode 70, so that the current through winding 76 remains constant. When the saturable reactor 74 is driven out of saturation, the inductance of winding 80, of course, increases. The increased inductance of the winding 80 lowers the resonant frequency of the frequency controlling circuit for oscillator 44, which frequency controlling circuit comprises winding 80 and capacitor 82, to thereby reduce the frequency of oscillation of the oscillator 44. Since the magnitude of the direct current output of rectifier 64 is dependent upon the frequency as well as the magnitude of the alternating current output of inverter 10 and the frequency of the alternating current output of inverter 10 is dependent upon the frequency of oscillation of oscillator 44, the increase in the magnitude of the direct current input to the inverter 10 causes the frequency of operation of inverter 10 to decrease thereby maintaining the magnitude of the direct current output from the rectifier 64 at a constant value.

The illustrated oscillator is a feedback controlled oscillator having a substantially square wave output. The polarity of the potential applied to base 84 of transistor 86 of the oscillator 44 depends upon the polarity of the potential at the bottom end of winding 80 of saturable reactor 74. Similarly, the polarity of the potential applied to the base 88 of transistor 90 is dependent upon the polarity of the potential at the top end of winding 80 of saturable reactor 74. Of course, the polarity of the ends of the winding 80 of saturable reactor 74 changes in accordance with the frequency of oscillation of the feedback or frequency controlling circuit comprising winding 80 and capacitor 82. The winding 80 of saturable reactor 74 and the capacitor 82 form a series resonant circuit, the frequency of which is determined in accordance with the equation $$f_0 = \frac{1}{2\pi\sqrt{LC}}$$

where $f_0$ is the resonant frequency, L is the inductance of the winding 80 and C is the capacitance of the capacitor 82. Of course, the frequency with which the polarity of the ends of the winding 80 of saturable reactor 84 varies determines the frequency of the potential applied to the bases 84 and 88 to thereby determine the frequency at which transistors 86 and 90 will turn on and off. That is, when the top end of winding 80 is negative the base 88 of transistor 90 is negative and the base 84 of transistor 86 is positive so that transistor 90 is conductive and transistor 86 is non-conductive. Conversely, when the bottom end of winding 80 is negative the base 84 is negative and the base 88 is positive so that transistor 86 is now conductive and transistor 90 is non-conductive.

While there has been shown and described what is at present considered to be the preferred embodiment of the invention, modifications thereto will readily occur to those skilled in the art. It is not desired, therefore, that the invention be limited to the specific arrangement shown and described and it is intended to cover in the appended claims all such modifications as fall within the true spirit and scope of the invention.

We claim as our invention:

1. An electrical system comprising, a controlled frequency inverter having a randomly varying direct current input and an alternating current output, means rectifying said alternating current output, a saturable reactor having a plurality of windings, one winding of said saturable reactor being connected to the output of said rectifying means to produce a magnetic flux in one direction in the core of said saturable reactor, means applying a constant magnitude direct current potential to a second winding of said saturable reactor to produce a magnetic flux in opposition to the flux produced by said one winding, the flux produced by said second winding being sufficient to saturate the core of said saturable reactor at the lowest expected magnitude of direct current input to said inverter, and inductive means utilizing the degree of saturation of said saturable reactor to control the frequency of operation of said controlled frequency inverter.

2. An electrical system comprising, a controlled frequency inverter having a randomly varying direct current input and an alternating current output, means rectifying said alternating current output, a saturable reactor having a plurality of windings, one winding of said saturable reactor being connected to the output of said rectifying means to produce a magnetic flux in one direction in the core of said saturable reactor, means applying a constant magnitude direct current potential to a second winding of said saturable reactor to produce a magnetic flux in opposition to the flux from said one winding, the flux produced by said second winding being sufficient to saturate the core of said saturable reactor at the lowest expected magnitude of direct current input to said inverter, an oscillator comprising a frequency controlling circuit, said frequency controlling circuit comprising a third winding of said saturable reactor, the inductance of said third winding being effective to control the frequency of oscillation of said oscillator in accordance with the degree of saturation of said saturable reactor, and means utilizing the output of said oscillator to control the frequency of operation of said controlled frequency inverter.

3. An electrical system comprising, a controlled frequency inverter having a direct current input and an alternating current output, means rectifying said alternating current output, a circuit sampling the output of said rectifying means, a saturable reactor having a plurality of windings, a frequency controlled oscillator comprising two transistors and a frequency controlling circuit, said frequency controlling circuit comprising an inductive winding of said saturable reactor, said sampling circuit applying potential to at least one other winding of said saturable reactor to thereby vary the inductance of said inductive winding to control the frequency of oscillation of said oscillator, and means utilizing the output of said oscillator to control the frequency of operation of said controlled frequency inverter.

4. An electrical system comprising a controlled frequency inverter having a direct current input and an alternating current output, said inverter comprising a plurality of controlled rectifiers each having a conducting and a non-conducting state, a first pair of said controlled rectifiers being serial connected with a first center tap inductor between them across said direct current input, a second pair of controlled rectifiers serially connected with a second center tap inductor between them in parallel circuit relationship with said first pair of controlled rectifiers, the inductors having their center taps interconnected, means rectifying said alternating current output, a saturable reactor having a plurality of windings, one winding of said saturable reactor being connected to the output of said rectifying means to produce a magnetic flux in one direction in the core of said saturable reactor, means applying a constant magnitude direct current potential to a second winding of said saturable reactor to produce a magnetic flux in opposition to the flux from said one winding, the flux produced by said second winding being sufficient to saturate the core of said saturable reactor at the lowest expected magnitude of direct current input to said inverter, an oscillator operable to render diagonally opposed controlled rectifiers alternately conductive and non-conductive to thereby cause an alternating current to flow between said interconnected center taps to provide said alternating current output, a frequency controlling said circuit for said oscillator, said frequency controlling circuit comprising a third winding of said saturable reactor, the inductance of said third winding being effective to control the frequency of oscillation of said oscillator in accordance with the degree of saturation of said saturable reactor.

5. An electrical system comprising a controlled frequency inverter having a direct current input and an alternating current output, said inverter comprising a plurality of controlled rectifiers each having a conducting and a non-conducting state, a first pair of said controlled rectifiers serially connected with a first center tap inductor between them across said direct current input, a second pair of said controlled rectifiers serially connected with a second center tap inductor between them in parallel circuit relationship with said first pair of controlled rectifiers, the inductors having their center taps interconnected, means rectifying said alternating current output, a saturable reactor having a plurality of windings, one winding of said saturable reactor being connected to the output of said rectifying means to produce a magnetic flux in one direction in the core of said saturable reactor, means applying a constant magnitude direct current potential to a second winding of said saturable reactor to produce a magnetic flux in opposition to the flux from said one winding, the flux produced by said second winding being sufficient to saturate the core of said saturable reactor at the lowest expected magnitude of direct current input to said inverter, an oscillator operable to render diagonally opposite control rectifiers conductive and non-conductive to thereby cause an alternating current to flow between said interconnected center taps to provide said alternating current output, said oscillator comprising two transistors and a frequency controlling circuit, said frequency controlling circuit comprising a third winding inductively coupled to said saturable reactor, and means utilizing the output of said oscillator to control the frequency of operation of said controlled frequency inverter.

References Cited by the Examiner

UNITED STATES PATENTS

| | | | |
|---|---|---|---|
| 2,968,738 | 1/1961 | Pintell | 321—2 |
| 2,987,664 | 6/1961 | Poirier et al. | 331—113.1 |
| 2,999,972 | 9/1961 | Stroman | 321—2 |
| 3,004,206 | 10/1961 | Sheffet | 321—2 |
| 3,010,062 | 11/1961 | Van Emden | 321—18 |

FOREIGN PATENTS 1,190,868  4/1959  France.

OTHER REFERENCES

IBM Technical Disclosure Bulletin, vol. 3, No. 6, November 1960, Regulated Power Supply, pp. 48.

LLOYD McCOLLUM, *Primary Examiner.*

SAMUEL BERNSTEIN, *Examiner.*

G. J. BUDOCK, G. GOLDBERG, J. J. KISSANE,
*Assistant Examiners.*